US011064420B2

(12) United States Patent
Cui et al.

(10) Patent No.: US 11,064,420 B2
(45) Date of Patent: *Jul. 13, 2021

(54) SYSTEMS AND METHODS FOR PROCESSING PACKET TRAFFIC WITHOUT AN EXPLICIT CONNECTION ORIENTED SIGNALING PROTOCOL

(71) Applicant: AT&T Intellectual Property I, L.P., Atlanta, GA (US)

(72) Inventors: Zhi Cui, Sugar Hill, GA (US); Jiansong Wang, Lincroft, NJ (US); Thomas Anschutz, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,589

(22) Filed: Jan. 3, 2020

(65) Prior Publication Data
US 2020/0145902 A1  May 7, 2020

Related U.S. Application Data

(63) Continuation of application No. 15/912,094, filed on Mar. 5, 2018, now Pat. No. 10,548,062.

(51) Int. Cl.
*H04W 40/28* (2009.01)
*H04W 4/70* (2018.01)
(Continued)

(52) U.S. Cl.
CPC ............ *H04W 40/28* (2013.01); *H04W 4/70* (2018.02); *H04W 8/26* (2013.01); *H04W 12/06* (2013.01);
(Continued)

(58) Field of Classification Search
None
See application file for complete search history.

(56) References Cited

U.S. PATENT DOCUMENTS 9,037,724 B2   5/2015   Kavanaugh et al.
9,038,151 B1   5/2015   Chua et al.
(Continued)

FOREIGN PATENT DOCUMENTS

WO   WO 2017/126892 A1   7/2017

*Primary Examiner* — Bob A Phunkulh
(74) *Attorney, Agent, or Firm* — BakerHostetler LLP (57) ABSTRACT

A software defined network controller receives from a radio access network access point an attach request generated by a user equipment that includes a user equipment identification and an IP address for the radio access network access point. The controller assigns a temporary identification to the user equipment and sends a modified attach request including the temporary identification, and application server identification and an application server IP address to the radio access network access point. The controller configures a forwarding table associated with the radio access network access point so that the access point forwarding table matches the user equipment identification, the application server identification and the application server IP address. The controller configures a service edge creation environment function forwarding table so that the forwarding table matches the user equipment identification mapped to the radio access network access point IP address and instructs an action so that packet traffic to and from the user equipment is processed without an explicit connection oriented signaling protocol.

20 Claims, 8 Drawing Sheets

(51) Int. Cl.
  *H04W 48/20* (2009.01)
  *H04W 40/24* (2009.01)
  *H04W 12/06* (2021.01)
  *H04W 8/26* (2009.01)
  *H04W 92/04* (2009.01)

(52) U.S. Cl.
  CPC ......... *H04W 40/248* (2013.01); *H04W 48/20* (2013.01); *H04W 92/045* (2013.01)

(56) References Cited

U.S. PATENT DOCUMENTS

| | | |
|---|---|---|
| 9,497,624 B2 | 11/2016 | Kahn et al. |
| 9,769,069 B2 | 9/2017 | Cui et al. |
| 2014/0244851 A1 | 8/2014 | Lee |
| 2015/0119050 A1 | 4/2015 | Liao et al. |
| 2016/0135111 A1* | 5/2016 | Huang ............ H04W 36/0011 370/254 |
| 2017/0079000 A1 | 3/2017 | Xue et al. |
| 2017/0149614 A1 | 5/2017 | Zheng et al. |
| 2017/0195255 A1 | 7/2017 | Pham et al. |
| 2017/0244619 A1 | 8/2017 | Bhatia et al. |
| 2017/0251393 A1 | 8/2017 | Cui et al. |
| 2017/0280438 A1 | 9/2017 | Balachandran et al. |
| 2017/0332420 A1 | 11/2017 | Cui et al. |
| 2017/0347251 A1 | 11/2017 | Kim et al. |
| 2017/0347283 A1 | 11/2017 | Kodaypak |
| 2017/0374694 A1 | 12/2017 | Kotecha et al. |
| 2018/0183725 A1 | 6/2018 | Ben-Hagai |
| 2018/0302877 A1 | 10/2018 | Bosch et al. |
| 2018/0309664 A1 | 10/2018 | Balasubramanian et al. |
| 2018/0316608 A1 | 11/2018 | Dowlatkhah et al. |
| 2018/0332441 A1 | 11/2018 | Shaw et al. |
| 2019/0007851 A1 | 1/2019 | Lee |
| 2019/0045374 A1 | 2/2019 | Loomba et al. |
| 2019/0159106 A1 | 5/2019 | Jin et al. |

* cited by examiner

| UE | UE-Temp-id | AP-IP Address | AS-id(s) | AS-IP Address |
|----|------------|---------------|----------|---------------|
|    |            |               |          |               |

FIG. 3a

| UE | UE-Temp-id | AP-IP Address | Output Port | Add Routing tag |
|----|------------|---------------|-------------|-----------------|
|    |            |               |             |                 |

FIG. 3b

| UE | AP-IP Address | Output Port | Add Routing tag |
|----|---------------|-------------|-----------------|
|    |               |             |                 |

SYSTEMS AND METHODS FOR PROCESSING PACKET TRAFFIC WITHOUT AN EXPLICIT CONNECTION ORIENTED SIGNALING PROTOCOL

CROSS REFERENCE TO RELATED APPLICATIONS

This application is a continuation of, and claims priority to, U.S. patent application Ser. No. 15/912,094, filed Mar. 5, 2018, entitled "Systems And Methods For Processing Packet Traffic Without An Explicit Connection Oriented Signaling Protocol," the entire contents of which are hereby incorporated herein by reference.

TECHNICAL FIELD

The embodiments of this disclosure are related to the field of networking. More specifically, the embodiments of the disclosure relate to methods and systems for an Internet of Things (IoT) device access to a mobile network without an explicit connection oriented signaling protocol.

BACKGROUND

Mobile traffic has been growing at a very fast pace. More and more nontraditional types of devices that communicate with each other, such as monitoring devices, meter reader, etc., are emerging. These machine to machine (M2M) and internet of things (IoTs) emerging end devices are expected to grow to 10 to 100 billion in next few years. These small form factor devices need to be very simple to be cost effective and to yield long battery life (>10 years). These devices most likely do not have IP protocol stack and IP addresses. In addition, these M2M and IoT devices normally send very small amount data.

Traditionally, each time a mobile device sends packets, the 3GPP signaling procedure sets up a dedicated radio bearer and dedicated GPRS Tunneling protocol (GTP) tunnel to carry these packets. A bearer service is a link between two points, which is defined by a certain set of characteristics. GTP is an IP/UDP based protocol used in GSM, UMTS and LTE core networks. It is used to encapsulate user data when passing through core network and also carries bearer specific signaling traffic between various core network entities. Whenever a User equipment (UE) is being provided with any service (e.g. circuit switched (CS) or packet switched (PS) service), the service has to be associated with a radio bearer specifying the configuration for Layer-2 and Physical Layer in order to have its quality of service (QOS) clearly defined. Typically IP packets sent by a UE are delivered through a GTP tunnel, that is the IP packets are delivered from an eNodeB to a packet data network gateway (P-GW) regardless of their specified destination IP address. Signaling overhead to set up these GTP tunnels are substantial requiring more bytes than the IoT user data itself.

3GPP Narrow-band IoTs (NB-IoTs) use the following mechanism for UE data delivery. First, user data will be transmitted through data over non-access stratum (NAS) messages (as unstructured data) or through a short message service (SMS) application over NAS message (as structured data) using NAS signaling connection, since the IoT user data is small enough to use the NAS encapsulation. As a background, today for the NAS signaling, the eNB sets up SRB1 (signaling radio bearer 1, for radio resource control (RRC) messages, which may include a piggybacked NAS message) and SRB2 (for NAS messages, using a dedicated control channel (DCCH)) for carrying the signaling messages. SRB 1 is used when the NAS messages are piggybacked in the RRC establishment, release and modification messages. SRB2 is used when the NAS message is independently sent from/to a mobility management entity (MME) to/from UE. In general, SRB2 is set up when the data radio bearers (DRBs) are established. On the S1-MME interface, the user signaling is identified by the logical S1 application protocol (S1AP) connection dedicated to the user.

Second, the simplification for the NB-IoT with the Non-IP solution in 3GPP is that the user data is sent in the Radio Resource Control (RRC) establishment message. So only the SRB1 is used. On the S1-MME (mobility management entity) interface, (the S1 interface is the interface between the LTE RAN and evolved packet core) the dedicated S1AP logic connection is still needed to be set up. The MME then reads the NAS message, which include the UE S-TMSI (SAE-Temporary Mobile Subscriber Identity) of the UE. Then MME can map the S-TMSI to the UE true IMSI (International Mobile Subscriber Identity), MSISDN (Mobile Station International Subscriber Directory Number) and IMEI (International Mobile Equipment Identity) and send the NAS message to the Service Creation Environment Function (SCEF) function over a TS6a interface, which is a diameter interface. Diameter interfaces provide connection among Diameter nodes to enable essential service provider network functions such as authentication, online and offline billing, and policy and charging.

Third, even though user bearer setup is not needed for IoT data delivery, the problem is shifted to the signaling plane. The network could run into scalability issue of the signaling channel when the network needs to support 10's of billions of IoT devices. Also, the signaling path is still connection-oriented, i.e. to set up signaling bearers, such as SRB0, SRB1, SRB2, with multiple logical connections and temporary UE ids assigned by multiple network elements, e.g. MME, eNB, etc.

Consequently, there is still a need to efficiently deliver packets from M2M and IoT devices.

SUMMARY

The present disclosure proposes an efficient network architecture to deliver services for Non-IP mobile devices. It is based on the connectionless frameworks using SDN, and extends to non-IP types of end devices. It allows the benefits of connectionless concept be realized for any types of the end devices and addressing schemes they may use.

One general aspect includes a method for processing a request for services by a UE including: receiving at a software defined network controller (SDN controller) from a radio access network (RAN) access point (AP) an attach request generated by the UE, the attach request including a UE identification and an AP IP address for the RAN AP; assigning a temporary identification (Temp ID) to the UE; sending a modified attach request to the RAN AP where the modified attach request includes the Temp ID, an application server identification (AS ID) and an application server IP address (AS IP address). The method also includes configuring an AP forwarding table associated with the RAN AP where the AP forwarding table matches the UE identification, the AS ID and the AS IP address and instructs an AP action. The method also includes configuring a service edge service creation environment function (SE/SCEF) forwarding table, where the SE/SCEF forwarding table matches the UE identification mapped to the AP IP address and instruct an SE/SCEF action whereby packet traffic to and from the UE is processed without an explicit connection oriented signaling protocol.

The method further including authenticating the attach request by sending an authentication request including the UE identification to an authentication server; and receiving an authentication response from the authentication server where the authentication response includes the UE identification, the AS ID and the AS IP address.

One general aspect includes a system for processing a request for services by a UE including an SDN controller and a memory coupled to the SDN controller and configured to store program instructions executable by the software defined network. The program instructions include instructions to receive from a RAN AP an attach request generated by the UE, the attach request including a UE identification and an AP IP address for the RAN AP. The program instructions further include instructions to assign a Temp ID to the UE and send a modified attach request to the RAN AP. The modified attach request includes the Temp ID, an AS ID and an AS IP address. The program instructions further include instructions to configure an AP forwarding table associated with the RAN AP where the AP forwarding table matches the UE identification, the AS ID and the AS IP address and instruct an AP action. The program instructions further include instructions to configure an SE/SCEF forwarding table, where the SE/SCEF forwarding table matches the UE identification mapped to the AP address and instruct an SE/SCEF action whereby packet traffic to and from the UE is processed without an explicit connection oriented signaling protocol.

Another general aspect include a system where the program instructions executable by the software defined network controller include program instructions to authenticate the attach request. Authentication of the attach request is accomplished by sending an authentication request including the UE identification to an authentication server; and receiving an authentication response from the authentication server where the authentication response includes the UE identification, the AS ID and the AS IP address.

Another general aspect includes a non-transitory computer-readable storage medium, including program instructions, where the program instructions are executable by a software defined network controller to: receive from a RAN AP an attach request generated by the UE, the attach request including a UE identification and an AP IP address for the RAN AP: assign a Temp ID to the UE; send a modified attach request to the RAN AP where the modified attach request includes the Temp ID, an AS ID and an AS IP address; configure an AP forwarding table associated with the RAN AP where the access point forwarding table matches the UE identification, the AS ID and the AS IP address and instructs an AP action; and configure an SE/SCEF forwarding table, where the SE/SCEF forwarding table matches the UE identification mapped to the AP IP address and instructs an SE/SCEF action whereby packet traffic to and from the UE is processed without an explicit connection oriented signaling protocol.

Another general aspects includes the non-transitory computer-readable storage medium where the program instructions further include program instructions that are computer-executable to authenticate the attach request by sending an authentication request including the UE identification to an authentication server; and receiving an authentication response from the authentication server where the authentication response includes the UE identification, the AS ID and the AS IP address.

DETAILED DESCRIPTION OF ILLUSTRATIVE EMBODIMENTS

Figure 1:
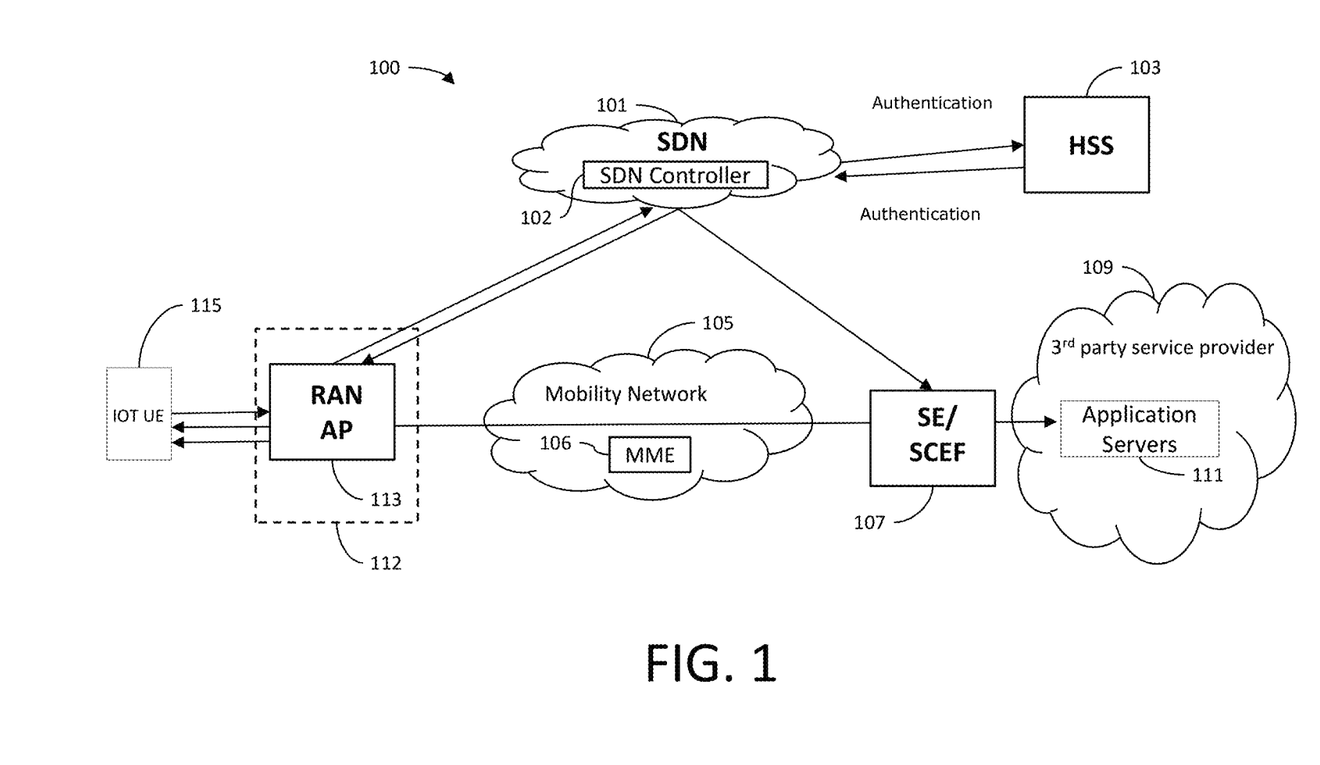
FIG. 1 is a schematic representation of an embodiment of a system for processing a request for services by a UE.

Illustrated in FIG. 1 is a system 100 for connecting M2M and IoT UE devices to a network. The system includes a software defined network (SDN) 101. SDN 101 separates the data plane and control plane of the network and introduces a logically centralized control plane, through SDN controller 102, to abstract the control functions of network. As a result, network devices are simplified to a great grade, and their packet forwarding and data processing functions can be programmed via an open interface. Thus, SDN considerably simplifies the network devices and makes networks more controllable and flexible. SDN controller 102 is a centralized entity capable of translating requirements from an SDN application to the SDN data paths, and providing the SDN applications with an abstract view of the network. The SDN controller 102 includes a plurality of north bound interface agents, SDN control logic and a control to data plane interface driver (not shown). SDN applications are programs that communicate network requirements and desired network behavior to the SDN controller 102 via a northbound interface (NBI). An SDN Application is typically comprised of an SDN application logic and a plurality of NBI Drivers. An SDN data path comprises a control to data-plane Interface (CDPI) agent and a plurality of traffic forwarding engines and may include traffic processing functions. The SDN data path may comprise multiple virtual routers and virtual switches (not shown). SDN 101 shifts control of the network from hardware to software, giving customers more control of their network services. This creates an "intelligent" network that is more flexible, efficient and aware of applications. SDN architecture enables the use of network-related security applications due to the central view of the network by the SDN Controller 102, and its ability to reprogram the data plane at any time.

The SDN 101 may access an authentication server such as a home subscriber system (HSS) 103. HSS 103 may be any database with subscription and service information. An authentication server is an application that facilitates authentication of an entity that attempts to access a network. Such an entity may be a human user or another server. An authentication server can reside in a dedicated computer, an Ethernet switch, an access point a network access server or in an HSS 103. HSS 103 is a network element residing in the control plane that acts as a central repository of all subscriber-specific authorizations and service profiles and preferences for an IMS network. The HSS 103 may reside in the core network of a mobility network 105. The HSS 103 integrates several functions, some of which exist already in the functions of the Home Location Register of mobile networks. These include a subscriber profile database; subscriber service permissions; subscriber preference settings, mobile authentication server; home location register (HLR) for mobile roaming; subscriber presence function and subscriber location function. An HSS was the evolution of the HLR in the General Packet Radio Service system. But both HSS and HLR are databases at the backend and a message protocol processor at the frontend. In the 3GPP, 5G network reference architecture, the backend and the frontend are separated. The frontend is called "UDM", (Unified Data Management Function). The backend is called "UDR", (Unified Data Repository). The Authentication function is also separated from the HSS. The AUSF function (Authentication Server Function) is a frontend application and it can use the UDR as the storage place for security data. Although the example above refers to an HSS, the system 100 may be used with an UDM/AUSF/UDR architecture.

HSS 103 includes the main subscriber database used within an IP Multimedia Subsystem (IMS) which provides details of the subscribers to other entities within the network. The IMS is a concept for an integrated network of telecommunications carriers that would facilitate the use of IP (Internet Protocol) for packet communications in all known forms over wireless or landline. The IMS enables users to be granted or refused access to other services dependent on their status. It contains the subscription-related information (subscriber profiles), performs authentication and authorization of the user, and can provide information about the subscriber's location and IP information.

The system 100 may also include a mobility network 105 for implementing mobility management. Mobility network 105 includes a mobility management entity (MME) 106 for mobility management (e.g., location update, handover). The MME interacts with HSS 103 for user authentication and mobility management. The MME also interacts with a servicing Gateway (S-GW) (not shown) for data session establishment/release. S-GW is on the data path and has as a main function packet routing/forwarding, traffic management, and traffic accounting for billing. S-GW is also the interface point for legacy cellular data systems (e.g., UMTS (or 3G)). Mobility network 105 also includes a PDN Gateway (P-GW) (not shown) that acts as a gateway to external networks (e.g. the Internet).

The system 100 may include a service edge (SE) service capability exposure function (SCEF) (SE/SCEF) server 107. SE/SCEF server 107 is the key entity within the 3GPP architecture for service capability exposure that provides a means to securely expose the services and capabilities provided by 3GPP network interfaces. SCEF resides either on the edge of an IoT domain or completely within the IoT domain, interfacing with an external API Management Platform at the edge. SE/SCEF 107 communicates to the network through a service management function that is the management environment that allows for deployment, provisioning and ongoing management of a service function.

The system 100 may also include a third party service provider network 109 having application servers 111. The fundamental function of application server 111 is to provide its clients with access to business logic, which generates dynamic content or code that transforms data to provide the specialized functionality offered by a business, service, or application. An application server's clients are often applications themselves, and can include web servers and other application servers. Application server 111 works in conjunction with other elements such as media servers and session controllers, providing business logic and intelligence for delivering supplementary services to business customer users and residential service subscribers. Application server 111 support multimedia IP communications including unified voice, video, text chat and presence.

Mobility network 105 may be accessed through a radio access network (RAN) 112 using a radio access network access point (RAN AP) 113. RAN AP 113 will be understood to be any of a transmission point (TP), a receive point (RP) and a transmit/receive point (TRP). It will be understood that the term AP can include the above mentioned nodes, as well as their successor nodes, but is not necessarily restricted to them. Mobility network 105 may be a Global System for Mobile Communications (GSM) network, a Universal Mobile Telecommunications System (UMTS) network, a General Packet Radio Service (GPRS) network, a Long-Term Evolution (LTE) network, a 5G network or any other type of mobility network.

The system 100 may be accessed by one or more machine to machine devices (M2M devices) or internet of things (IoT) user equipment, IoT UE 115. IoT UE 115 is any nonstandard computing device that connects wirelessly to a network and has the ability to transmit data. IoT UE 115 may include sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT UE 115 to communicate with a wide area network and with one or more other devices. IoT UE 115 may include temperature sensors, accelerometers, heat sensors, motion detector, meters, thermostats, light bulbs, door locks, fridges, cars, implants for RFID, pacemakers, etc.

Figure 2:
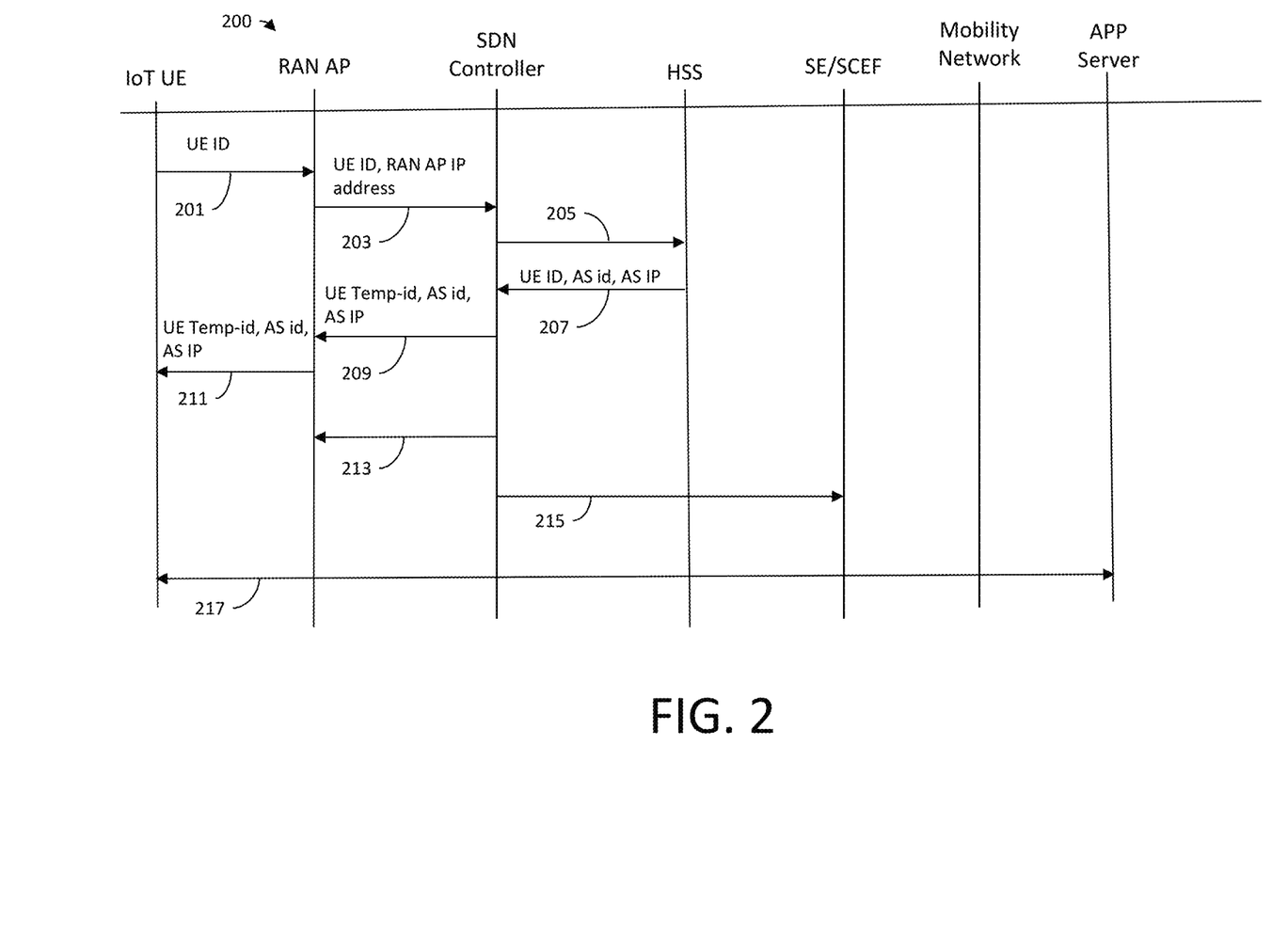
FIG. 2 is a signal flow diagram illustrating an embodiment of a method for processing a request for services by a UE.

FIG. 2 illustrates an exemplary method 200 of delivering packets using connectionless architecture for the non-IP IoTs. Non-IP IoT devices are IoT devices that use non-IP protocols to communicate within a local network. In this example, bearers and tunnels are eliminated.

In step 201, IoT UE 115 sends an attach request to RAN AP 113 that includes a UE identification (UE ID). The UE ID may be an International Mobile Subscriber Identity (IMSI), that is a unique number associated with all Global System for Mobile Communications (GSM) and Universal Mobile Telecommunications System (UMTS) network IoT device users used for identifying a GSM subscriber. The UE-ID may be an International Mobile Equipment Identity (IMEI) that is a number, usually unique, used to identify 3GPP and Integrated Digital Enhanced Network (iDEN) IoT device. The UE ID may be an integrated circuit card identifier (ICCID). The UE ID is not limited to cellular address. The UE ID can be any type of address.

In step 203 the RAN AP 113 forwards the UE attach request to SDN controller 102 in SDN 101 with the UE ID and the IP address for RAN AP 113.

In step 205 SDN controller 102 sends the UE attach request to HSS 103 (or an authentication server) for authentication.

Figure 3A:
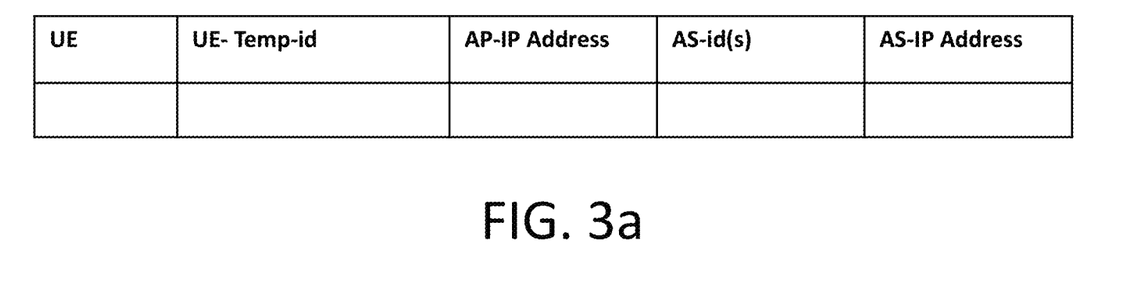
FIG. 3a is an example of a match action table associated with an SDN controller.

In step 207, upon successful authentication HSS 103 sends an acknowledgment back to the SDN controller 102 with the UE ID, identification of the services that the user subscribed to, including the ID for the application server 111 (AS-ID) and the IP address for the application server (AS IP address). This may be done explicitly or through a redirect to an application database. Upon receiving authentication acknowledgement from HSS 103, SDN controller 102 assigns a UE Temp-ID to the IoT UE 115. FIG. 3a illustrates an example of a match action table associated with the SDN controller 102.

In step 209 the SDN controller 102 assigns a UE Temp-ID and sends the attach response to the RAN AP 113 with an assigned UE Temp-ID the AS-ID and the AS IP address.

In step 211 the RAN AP 113 sends the attach response to the IoT UE 115 with the UE Temp-ID and other optional information such as AS-ID and AS IP address (e.g. electric company server ID and address, for an electric meter reader IoT device).

Figure 3B:
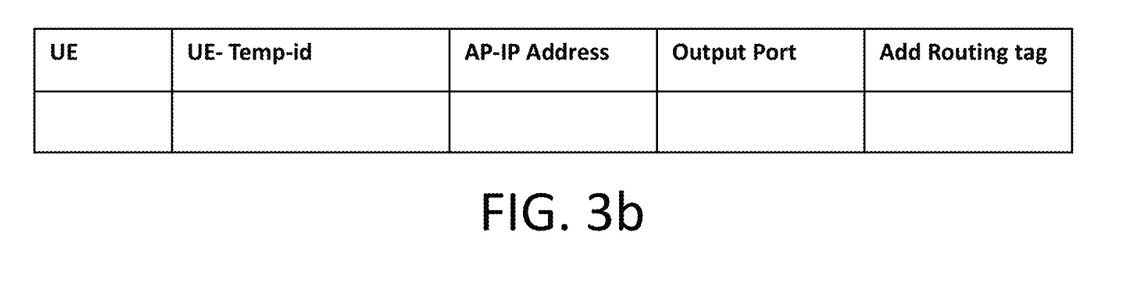
FIG. 3b is an example of a match action table associated with an SE/SCEF device.

In step 213 the SDN controller 102 configures the forwarding match action table (table will contain a set of entries that describe how packets matching that entry should be processed) of the RAN AP 113. FIG. 3b illustrates an example of a match action table associated with the RAN AP 113. Step 213 is triggered by the attach request received by the SDN controller in step 203. Match action tables are common in network devices that forward or process data packet traffic (e.g. RAN AP 103 and SE/SCEF 107). In a match action table, fields in the data packet header of arriving traffic are matched against match action table rows. When a match is found, the corresponding match action table row contains one or more action fields that specify the disposition of the packet. A disposition of a packet may include packet discard, forwarding the packet to the switch controller for software analysis, or modifying the packet header in a number of possible ways, then forwarding the packet to one or more output ports of the network device. Information in addition to the packet header can also be used as a match criterion. The configuration also includes the action of forwarding to a port and adding a tag for routing. The action of the RAN AP forwarding match action table is as follows:

Uplink: When sending packets to the server, based on UE-ID and/or AS-ID/or AS-IP address, the RAN AP add the routing tag and forward the packet out to an output port. Typically the RAN AP has a cache on AS-ID to AS IP address mapping. The routing tag is added to the packet to indicates the routing and service chaining vector information (i.e. the sequence of the routers/service nodes) in each packet so that the packet go through the same route to the SE or SCEF without the explicit connection-oriented signaling protocol. By using the tag, no tunnel is required.

Downlink: When sending packets to the device, the AP calculates the device wake up time and send the message over-the-air when the device is awake and listens to the air interface. The RAN temp-ID is included so that the device knows the message is for itself. In order to support confidentially, a device unique key and a RAN temp-ID can be the input to a ciphering algorithm.

Figure 3C:
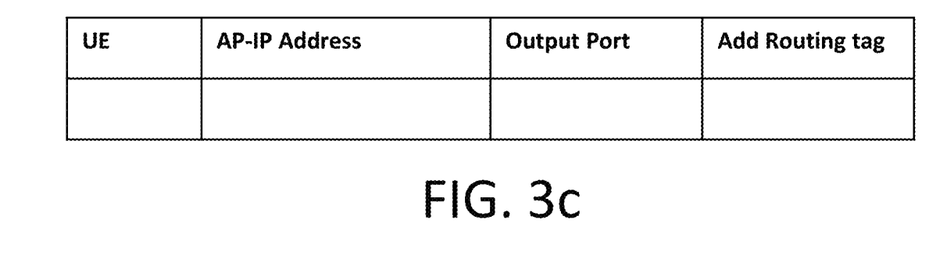
FIG. 3c is an example of a match action table associated with an RAN AP.

In step 215 the SDN controller 102 also configures the SE/SCEF 107 forwarding match action table (match: UE ID maps to an AP-IP address. Action: forward to a port and add tag for routing. FIG. 3c illustrates an example of a match action table associated with SE/SCEF 107. The action of the SE/SCEF forwarding match action table is as follows:

Downlink: When sending packets to the UE, based on UE-ID and AS-IP address, the routing tag is added and the packet is forwarded to an output port.

The routing tag is added to the packet to indicates the routing and service chaining vector information (i.e. the sequence of the routers/service nodes) in each packet so that the packet go through the same route to the UE IoT without the explicit connection-oriented signaling protocol. By using the tag, no tunnel is required. This solution can also be used for wireline network with DSL, WiFi, and PON, for the end devices such as Zigbee or Z-wave IoT devices.

In step 217, the IoT UE 115 or the application server 111 send packets.

Figure 4:
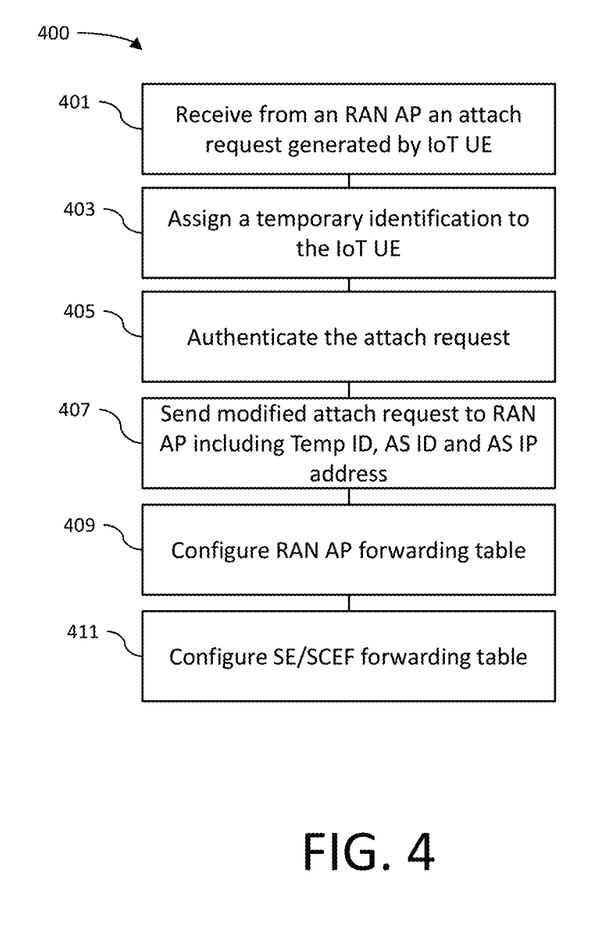
FIG. 4 is a flow diagram illustrating a method for processing a request for services by a UE.

FIG. 4 is a flow diagram illustrating a method implemented by the SDN controller 102.

In step 401, the SDN controller 102 receives a UE attach request from RAN AP 113.

In step 403, the SDN controller 102 assigns a temporary identification (UE Temp ID) to the IoT UE 115.

In step 405, the SDN controller 102 authenticates the attach request. Authentication may be accomplished by sending the attach request to an authentication server, such as HSS 103. Upon successful identity authentication SDN controller 102 receives an acknowledgment with the UE ID, identification of the services that the user subscribed to, including the AS-ID and the AS IP address. This may be done explicitly or through a redirect to an application database.

In step 407, the SDN controller 102 sends a modified attach request to the RAN AP 113. The modified attach request includes the Temp ID, the AS ID and the AS IP address.

In step 409, the SDN controller 102 configures the forwarding table associated with the RAN AP 113. The action of the RAN AP forwarding match action table is as follows:

Uplink: When sending packets to the server, based on UE-ID and/or AS-ID/or AS-IP address, the RAN AP add the routing tag and forward the packet out to an output port. Typically the RAN AP has a cache on AS-ID to AS IP address mapping. The routing tag is added to the packet to indicates the routing and service chaining vector information (i.e. the sequence of the routers/service nodes) in each packet so that the packet go through the same route to the SE or SCEF without the explicit connection-oriented signaling protocol. By using the tag, no tunnel is required.

Downlink: When sending packets to the device, the AP calculates the device wake up time and send the message over-the-air when the device is awake and listens to the air interface. The RAN temp-ID is included so that the device knows the message is for itself. In order to support confidentially, a device unique key and a RAN temp-ID can be the input to a ciphering algorithm.

In step 411, the SDN controller 102 configures the match action table associated with the SE/SCEF 107. The action of the SE/SCEF forwarding match action table is as follows:

Downlink: When sending packets to the IoT UE 115, based on UE-ID and AS-IP address, the routing tag is added and the packet is forwarded to an output port.

The routing tag is added to the packet to indicates the routing and service chaining vector information (i.e. the sequence of the routers/service nodes) in each packet so that the packet go through the same route to the IoT UE 115 without the explicit connection-oriented signaling protocol thereby facilitating the sending of packets by the IoT UE 115 or the application server 111. By using the tag, no tunnel is required.

Figure 5:
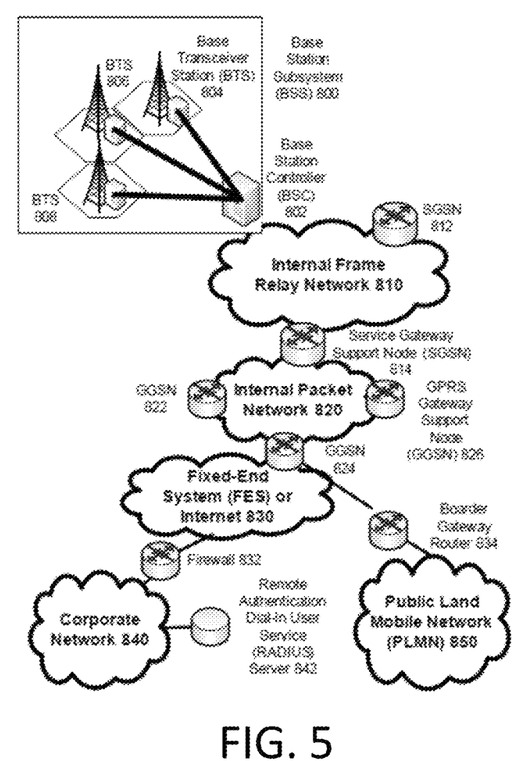
FIG. 5 is depicts an overall block diagram of an example packet-based mobility network, such as a GPRS network.

FIG. 5 depicts an overall block diagram of an example packet-based mobility network, such as a GPRS network. In the example packet-based mobile cellular network environment shown in FIG. 5, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there may be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 6:
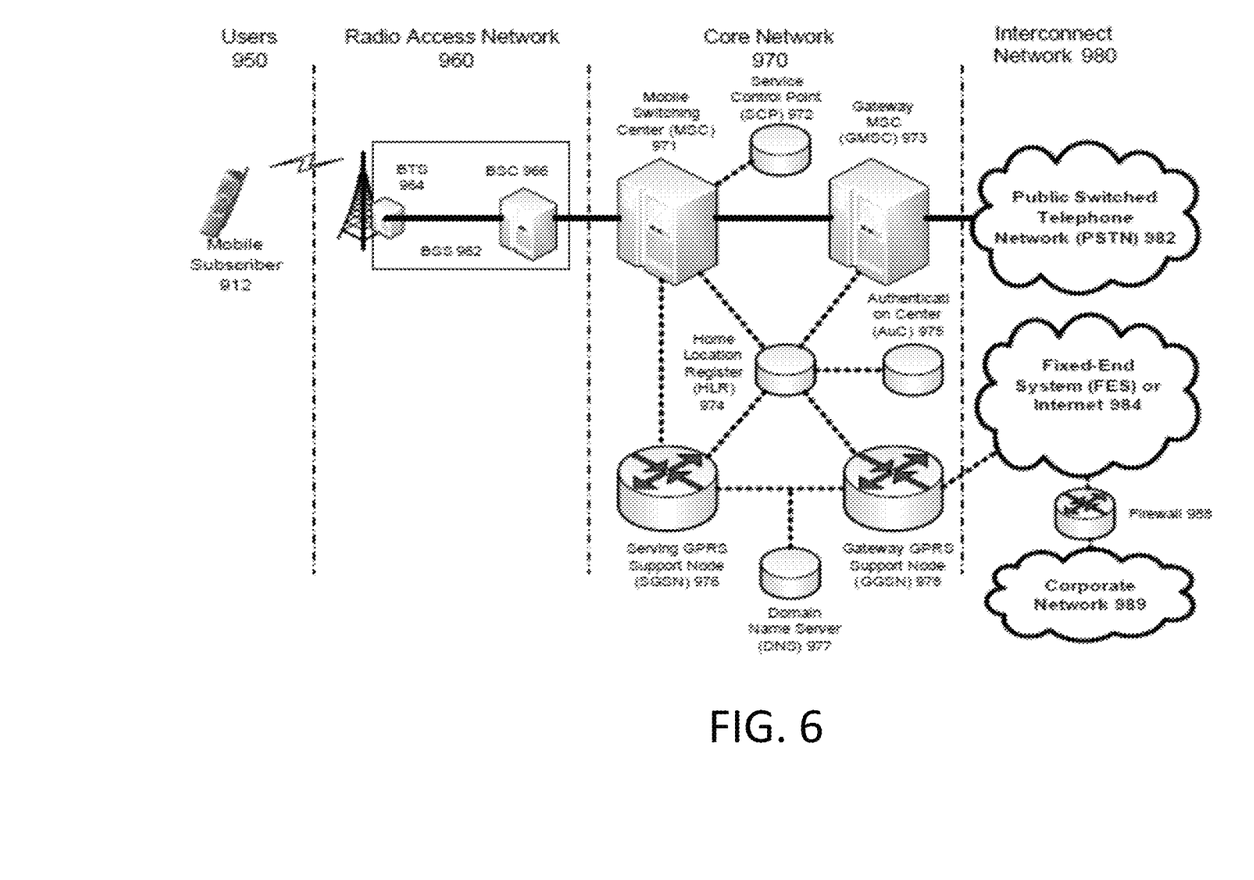
FIG. 6 an overall block diagram of an example packet-based mobility network, such as a GPRS network.

FIG. 6 illustrates an architecture of a typical GPRS network. The architecture depicted in FIG. 6 may be segmented into four groups: users 950, radio access network 960, core network 970, and interconnect network 980. Users 950 comprise a plurality of end users. Note, device 912 is referred to as a mobile subscriber in the description of network shown in FIG. 6. In an example embodiment, the device depicted as mobile subscriber 912 comprises a communications device (e.g., communications device 160). Radio access network 960 comprises a plurality of base station subsystems such as BSSs 962, which include BTSs 964 and BSCs 966. Core network 970 comprises a host of various network elements. As illustrated in FIG. 6, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 6, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding. When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 6, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 7:
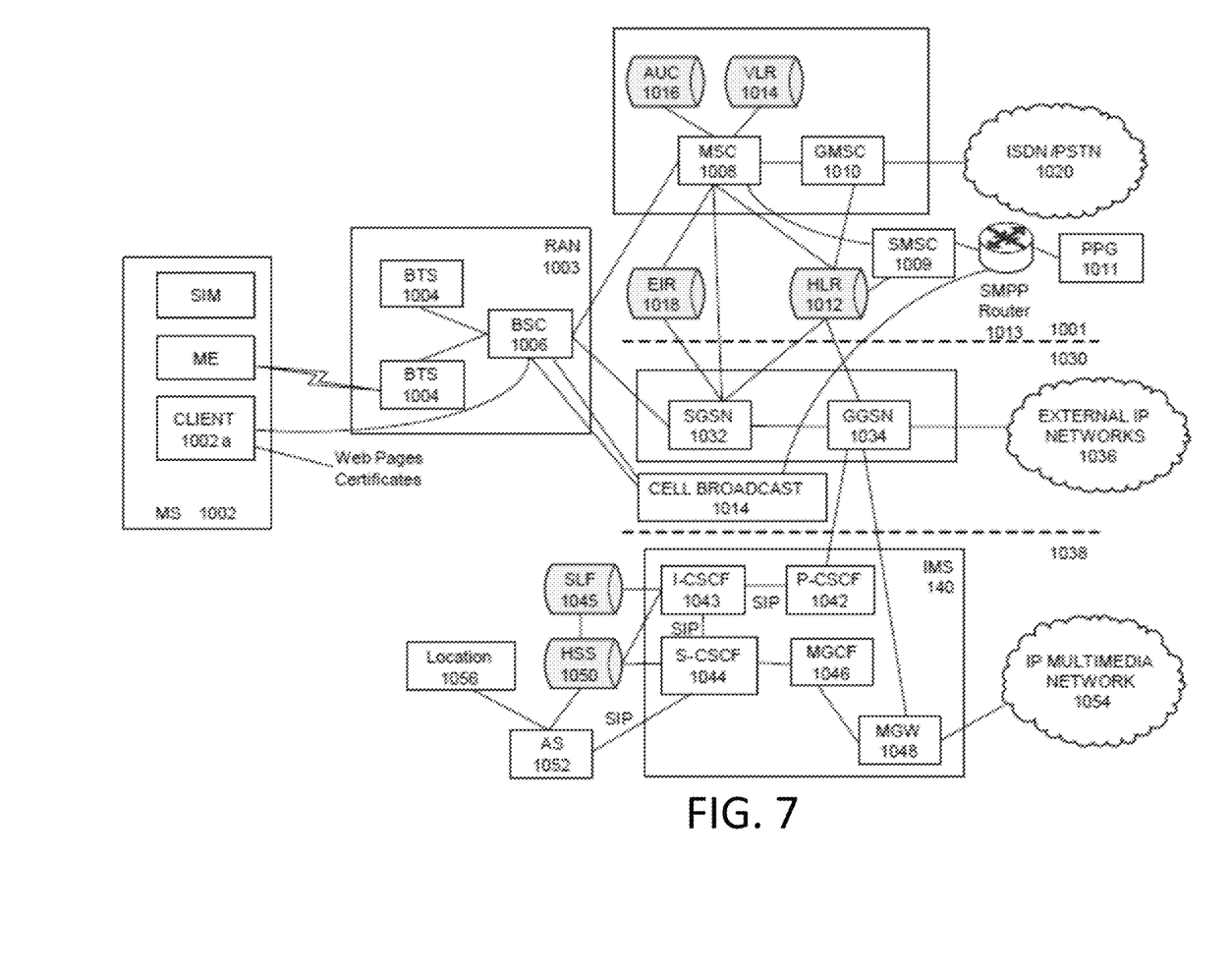
FIG. 7 illustrates an example block diagram view of a GSM/GPRS/IP multimedia network architecture.

FIG. 7 illustrates an example block diagram view of a GSM/GPRS/IP multimedia network architecture that may be utilized as the mobility network described herein. As illustrated, the architecture of FIG. 7 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 8:
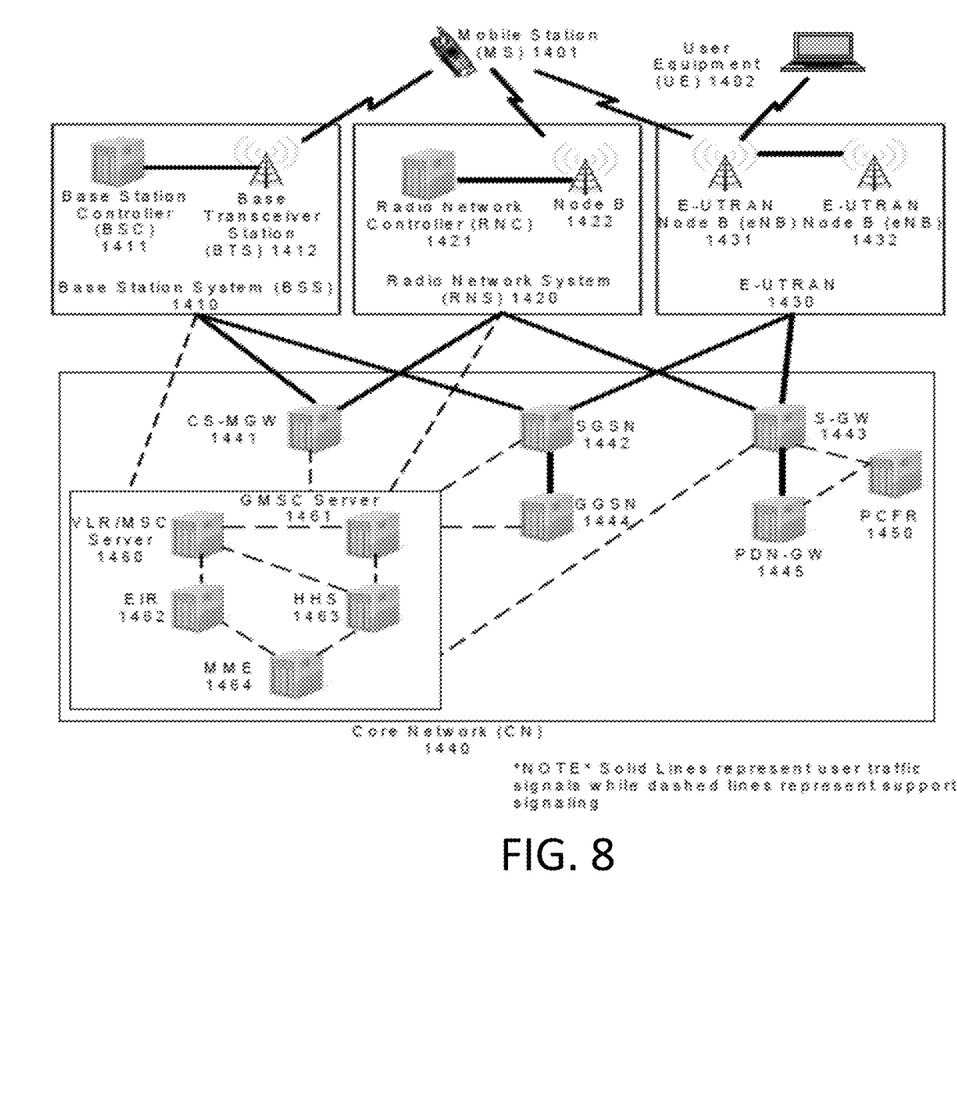
FIG. 8 illustrates a PLMN block diagram view of an example architecture of another embodiment of a mobility network.

FIG. 8 illustrates a PLMN block diagram view of an example architecture of another embodiment of a mobility network. Mobile Station (MS) 1401 is the physical equipment used by the PLMN subscriber. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 8 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

The methods described in the examples may be embodied directly in hardware, in a software module executed by a processor, or in a combination of the two. A software module may reside in any form of memory or storage medium such as RAM memory, flash memory, ROM memory, EPROM memory, EEPROM memory, registers, hard disk, a removable disk, a CD-ROM. The memory or storage medium may be coupled to the processor such that the processor can read information from, and write information to, the memory or storage medium. Alternatively, the storage medium may be integral to the processor. The processor and the storage medium may reside in an application-specific integrated circuit (ASIC). In some aspects, the steps and/or actions of a method may reside as one or any combination or set of codes and/or instructions on a machine readable medium and/or computer readable medium, which may be incorporated into a computer program product.

In any of the exemplary embodiments, the described functions may be implemented in hardware, software, firmware, or any combination thereof. Functions implemented in software may be stored on or transmitted over as instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed:

1. A method for processing a request for services by a user equipment (UE) comprising:
   receiving at a software defined network (SDN) controller from a radio access network (RAN) access point (AP) an attach request generated by the UE, the attach request including a UE identification and an AP IP address for the RAN AP;
   forwarding from the SDN controller to a home subscriber system (HSS) the attach request;
   receiving at the SDN controller an acknowledgment with UE identification, identification of the request for services, including an identification for an application server, and an application server IP address;
   forwarding to the RAN AP from the SDN controller an attach response including a UE temporary identification assigned by the SDN controller and the identification for the application server and the application server IP address assigned by the home subscriber system;
   configuring a forwarding match action table of the RAN AP; and
   configuring through the SDN controller a service edge service creation environment function (SE/SCEF) forwarding match action table whereby the SE/SCEF forwarding match action table matches the UE identification mapped to the AP IP address and instructs an SE/SCEF action whereby packet traffic to and from the UE is processed without an explicit connection oriented signaling protocol without requiring a tunnel.

2. The method of claim 1 further comprising authenticating the attach request.

3. The method of claim 2 wherein authenticating the attach request comprises:
   sending an authentication request including the UE identification to an authentication server; and
   receiving an authentication response from the authentication server wherein the authentication response includes the UE identification, an application server identification and the application server IP address.

4. The method of claim 1 wherein the UE identification comprises an International Mobile Subscriber Identity, an International Mobile Equipment Identity, or an integrated circuit card identifier.

5. The method of claim 1 wherein the user equipment is an internet of things device.

6. The method of claim 1 further comprising adding a first routing tag and forwarding packets to an AP output port.

7. The method of claim 1 wherein the SE/SCEF action is to add a second routing tag and forwarding packets to an SE/SCEF output port.

8. A system for processing a request for services by a user equipment (UE) comprising:
   a processor;
   memory coupled to the processor and configured to store program instructions executable by the processor to:
      receive at a software defined network (SDN) controller from a radio access network (RAN) access point (AP) an attach request generated by the UE, the attach request including a UE identification and an AP IP address for the RAN AP;
      forward from the SDN controller to a home subscriber system (HSS) the attach request;
      receive at the SDN controller an acknowledgment with UE identification, identification of the request for services, including an identification for an application server, and an application server IP address;
      forward to the RAN AP from the SDN controller an attach response including a UE temporary identification assigned by the SDN controller and the identification for the application server and the application server IP address assigned by the home subscriber system;
      configure a forwarding match action table of the RAN AP; and
      configure through the SDN controller a service edge service creation environment function (SE/SCEF) forwarding match action table whereby the SE/SCEF forwarding match action table matches the UE identification mapped to the AP IP address and instructs an SE/SCEF action whereby packet traffic to and from the UE is processed without an explicit connection oriented signaling protocol without requiring a tunnel.

9. The system of claim 8 wherein the program instructions executable by the processor further comprise program instructions to authenticate the attach request.

10. The system of claim 9 wherein the program instructions executable by the processor to authenticate the attach request comprise instructions to:
    send an authentication request including the UE identification to an authentication server; and receive an authentication response from the authentication server wherein the authentication response includes the UE identification, the identification for the application server identification and the application server IP address.

11. The system of claim 8 wherein the UE identification comprises an International Mobile Subscriber Identity, an International Mobile Equipment Identity, or an integrated circuit card identifier.

12. The system of claim 8 wherein the user equipment is an internet of things device.

13. The system of claim 8 further comprising program instructions executable by the processor to add a first routing tag and forwarding packets to an AP output port.

14. The system of claim 8 wherein the SE/SCEF action is to add a second routing tag and forwarding packets to an SE/SCEF output port.

15. A non-transitory computer-readable storage medium, comprising program instructions, wherein the program instructions are executable by a software defined network controller to:
   receive at a software defined network (SDN) controller from a radio access network (RAN) access point (AP) an attach request generated by a user equipment (UE), the attach request including a UE identification and an AP IP address for the RAN AP;
   forward from the SDN controller to a home subscriber system (HSS) the attach request;
   receive at the SDN controller an acknowledgment with UE identification, identification of a request for services, including an identification for an application server, and an application server IP address;
   forward to the RAN AP from the SDN controller an attach response including a UE temporary identification assigned by the SDN controller and the identification for the application server and the application server IP address assigned by the home subscriber system;
   configure a forwarding match action table of the RAN AP; and
   configure through the SDN controller a service edge service creation environment function (SE/SCEF) forwarding match action table whereby the SE/SCEF forwarding match action table matches the UE identification mapped to the AP IP address and instructs an SE/SCEF action whereby packet traffic to and from the UE is processed without an explicit connection oriented signaling protocol without requiring a tunnel.

16. The non-transitory computer-readable storage medium of claim 15 wherein the program instructions further comprise program instructions that are computer-executable to authenticate the attach request.

17. The non-transitory computer-readable storage medium of claim 16 wherein the program instructions to authenticate the attach request comprise program instructions to:
   send an authentication request including the UE identification to an authentication server; and
   receive an authentication response from the authentication server wherein the authentication response includes the UE identification, an application server identification (AS ID) and the application server IP (AS IP) address.

18. The non-transitory computer-readable storage medium of claim 16 wherein the UE identification comprises an International Mobile Subscriber Identity, an International Mobile Equipment Identity, or an integrated circuit card identifier.

19. The non-transitory computer-readable storage medium of claim 16 wherein the UE is an internet of things device.

20. The non-transitory computer-readable storage medium of claim 16 wherein the SE/SCEF action is to add a second routing tag and forwarding packets to an SE/SCEF output port.

* * * * *